United States Patent
Elton et al.

(10) Patent No.: US 10,796,280 B2
(45) Date of Patent: Oct. 6, 2020

(54) SYSTEM FOR PREPARATION OF MODIFIABLE RECIPE-BASED PRODUCTS

(71) Applicant: Simplified Technologies, Inc., Wilsonville, OR (US)

(72) Inventors: Ronald L. Elton, Newberg, OR (US); Michael Elton, Wilsonville, OR (US); Ted Allen, Wilsonville, OR (US); John William Swanson, Wilsonville, OR (US)

(73) Assignee: Simplified Technologies, Inc., Wilsonville, OR (US)

( * ) Notice: Subject to any disclaimer, the term of this patent is extended or adjusted under 35 U.S.C. 154(b) by 223 days.

(21) Appl. No.: 16/024,484

(22) Filed: Jun. 29, 2018

(65) Prior Publication Data
US 2019/0005450 A1    Jan. 3, 2019

Related U.S. Application Data

(60) Provisional application No. 62/526,902, filed on Jun. 29, 2017.

(51) Int. Cl.
| | |
|---|---|
| *H04W 4/029* | (2018.01) |
| *G06Q 10/08* | (2012.01) |
| *G06Q 30/06* | (2012.01) |
| *G01G 19/414* | (2006.01) |
| *H04W 4/02* | (2018.01) |

(52) U.S. Cl.
CPC ..... *G06Q 10/0875* (2013.01); *G01G 19/4144* (2013.01); *G06Q 30/0637* (2013.01); *H04W 4/02* (2013.01); *H04W 4/029* (2018.02)

(58) Field of Classification Search
CPC .......... G06Q 10/0875; G06Q 30/0637; H04W 4/029; H04W 4/02; G01G 19/4144

USPC .............................. 705/28, 29; 235/377–383
See application file for complete search history.

(56) References Cited

U.S. PATENT DOCUMENTS

| | | | | |
|---|---|---|---|---|
| 5,980,089 A | * | 11/1999 | Weis | G07D 1/00 194/200 |
| 6,550,681 B1 | | 4/2003 | Ross et al. | |
| 6,712,278 B2 | * | 3/2004 | Livingston | G08B 5/222 235/380 |
| 6,953,919 B2 | | 10/2005 | Clothier | |
| 7,151,968 B2 | | 12/2006 | Williamson | |
| 7,324,958 B2 | * | 1/2008 | Miyazaki | G06Q 20/20 705/15 |

(Continued)

FOREIGN PATENT DOCUMENTS

| | | |
|---|---|---|
| CN | 201055262 Y | 5/2008 |
| WO | 2017125749 A2 | 7/2017 |

OTHER PUBLICATIONS

Gutierrez, Anna, "Blended beverages boost profits: with the right equipment, presentation and ingredients, blended beverages can help distinguish your business and products from the next", Tea & Coffee Trade Journal, vol. 177, No. 6, Lockwood Trade Journal Co., Inc., Jun. 20, 2005, 6 pgs.

*Primary Examiner* — Andrew Joseph Rudy
(74) *Attorney, Agent, or Firm* — Chernoff Vilhauer LLP

(57) ABSTRACT

Systems and methods for the preparation of recipe-based products may include a computer-based system for parsing recipe steps and instructions, such that each of a plurality of product preparation stations receives and displays on an associated human-machine interface only those instructions associated with that product preparation station.

20 Claims, 4 Drawing Sheets

(56) References Cited

U.S. PATENT DOCUMENTS

| | | | |
|---|---|---|---|
| 8,419,434 | B2 | 4/2013 | Do et al. |
| 8,856,045 | B1 * | 10/2014 | Patel ................... G06Q 30/06 705/71 |
| 8,992,225 | B2 | 3/2015 | Do et al. |
| 9,338,141 | B2 * | 5/2016 | Cosentino ........... H04L 63/0428 |
| 9,509,825 | B2 * | 11/2016 | Leow ................... H04L 67/306 |
| 9,747,566 | B2 * | 8/2017 | Ng ....................... G06K 7/1417 |
| 9,797,873 | B1 | 10/2017 | Feller et al. |
| 9,918,590 | B2 | 3/2018 | Chen et al. |
| 9,934,784 | B2 * | 4/2018 | May ........................ G07G 1/01 |
| 10,142,375 | B2 * | 11/2018 | Ho ...................... H04L 65/1063 |
| 10,346,010 | B2 * | 7/2019 | Benayon ................ G06Q 10/06 |
| 10,580,062 | B1 * | 3/2020 | Abrons ................. G06F 16/219 |
| 2014/0295822 | A1 | 10/2014 | Koo et al. |
| 2015/0257586 | A1 | 9/2015 | DiNucci et al. |
| 2016/0201347 | A1 | 7/2016 | Lala |
| 2016/0235239 | A1 | 8/2016 | Patadia |
| 2016/0241653 | A1 | 8/2016 | Ciepiel |
| 2016/0309960 | A1 | 10/2016 | Kolar et al. |
| 2017/0221296 | A1 | 8/2017 | Jain et al. |
| 2017/0224149 | A1 | 8/2017 | Koennings et al. |

\* cited by examiner

SYSTEM FOR PREPARATION OF MODIFIABLE RECIPE-BASED PRODUCTS

CROSS-REFERENCES

This application claims the benefit under 35 U.S.C. § 119(e) of the priority of U.S. Provisional Patent Application Ser. No. 62/526,902, filed Jun. 29, 2017, the entirety of which is hereby incorporated by reference for all purposes.

INTRODUCTION

Recipe-based products are frequently encountered in business operations, such as in restaurant food preparation, factory food preparation, order picking, and kit-based manufacturing operations.

SUMMARY

The present disclosure provides systems, apparatuses, and methods relating to improved preparation of modifiable recipe-based products.

In some embodiments, a method of preparing recipe-based products may include receiving, via a terminal, order information for a recipe-based product; transmitting, via the terminal, the order information to a server computer; receiving, via the terminal, a recipe for the recipe-based product from the server computer; generating, using a token generator coupled to the terminal, a machine-readable token having the recipe stored therein; reading, via a first token reader at a first station, the generated token; communicating, via a first human-machine interface (HMI) at the first station, only the one or more steps of the recipe that are associated with the first station; reading, via a second reader at a second station, the generated token; and communicating, via a second HMI at the second station, only the one or more steps of the recipe that are associated with the second station.

In some embodiments, a method of preparing recipe-based products may include receiving, at a terminal, order information for a recipe-based product; transmitting, from the terminal, the order information to a server computer; receiving, at the terminal, a recipe for the recipe-based product from the server computer, wherein the recipe for the recipe-based product includes a predetermined target characteristic; generating, via a token generator in communication with the terminal, a token having the received recipe stored therein; reading, via a token reader, the generated token; communicating, via a human-machine interface (HMI) associated with the token reader, one or more of the steps of the recipe; and receiving, after receiving indication that all the steps of the recipe are completed, via at least one input device, results data regarding a relationship between the recipe-based product and the predetermined target characteristic.

In some embodiments, a system for preparing recipe-based products may include a point-of-sale (POS) terminal configured to receive orders selected from a plurality of recipe-based products; one or more product preparation stations each having an associated human-machine interface (HMI); processing logic in communication with the POS terminal and the one or more product preparation stations, the processing logic configured to: receive, from the POS terminal, an order identifying a product and product modifier information, wherein the product is selected from the plurality of recipe-based products; communicate preparation information to the one or more product preparation stations based on a recipe corresponding to the identified product and modified by the modification information; and communicate, via the respective HMI at each of the one or more product preparation stations, only steps of the recipe that are associated with the respective product preparation station.

Features, functions, and advantages may be achieved independently in various embodiments of the present disclosure, or may be combined in yet other embodiments, further details of which can be seen with reference to the following description and drawings.

DETAILED DESCRIPTION

Figure 1:
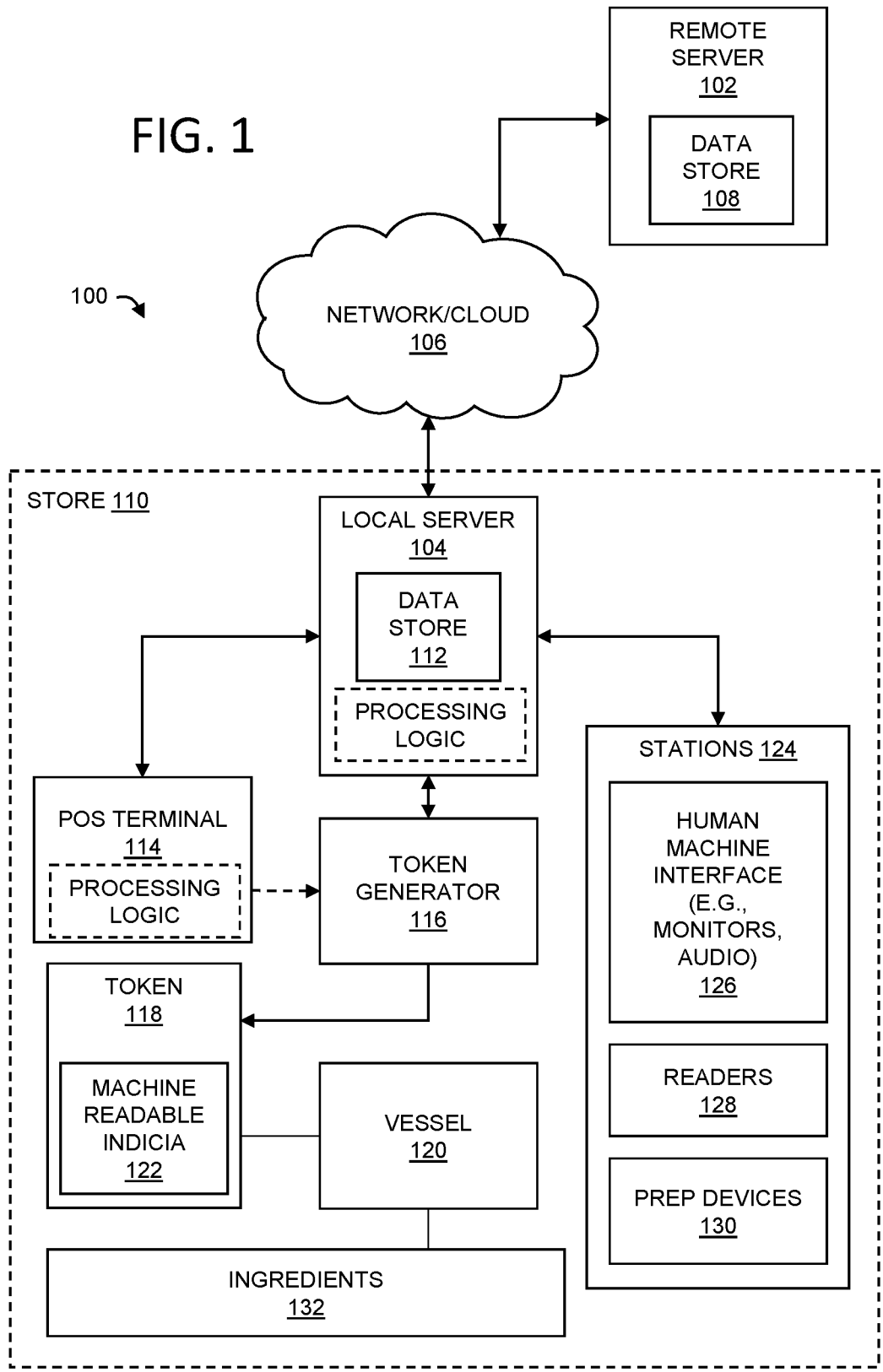
FIG. 1 is a schematic diagram of a system for preparing modifiable recipe-based products in accordance with aspects of the present disclosure.

Various aspects and examples of a system for preparation of modifiable recipe-based products, as well as related methods, are described below and illustrated in the associated drawings. Unless otherwise specified, such a system, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through E, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components, and is not necessarily limited to physical connection(s).

"Processing logic" may include any suitable device or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

Overview

In general, an improved system for the preparation of modifiable recipe-based products, as disclosed herein, may include an automated system (e.g., for use in the kitchen of a restaurant) configured to present recipe-related information at each of several work stations based on a customer's order information. Information presentation at each work station may be triggered and/or modified by an informational token that travels with the preparation or other vessel. The informational token may include a machine-readable indicator (e.g., a barcode or QR code) or machine-readable device (e.g., an RFID tag).

Existing solutions are flawed and error-prone. For example, at a typical smoothie restaurant, the customer will place an order for a smoothie with the counter server at the Point of Sale (POS) register. Basic order information (e.g., customer name, specific drink, added extras, etc.) may be printed on a paper ticket for each smoothie. The paper ticket is adhered to a mixing vessel (e.g., a blender pitcher) selected by the preparer/user based on the type of item ordered, for the duration of the smoothie preparation process.

Like other modifiable, recipe-based products, each smoothie has a precise recipe for each standard menu item, generated by a controlling entity (e.g., a corporate franchisor). The recipe information may be available to the food preparer on printed placards at each work station (e.g., juice station, sherbet station, fruit station, etc.), on informal printed sheets, or in the individual preparer's memory. The recipe information can include the type of ingredient, the amount of the ingredient to use, the sequence of adding ingredients, and settings for actions, such as blending. Additional information for customizing the food product based on a customer request may show as a separately-printed item on the paper ticket. The food preparer moves the ticket and pitcher from station to station to complete the order.

Existing methods result in errors (e.g., misreading or misremembering of recipes or steps), waste (e.g., excess ingredient use, rework), complexity, delays, and inflexibility (e.g., difficult to accommodate customized orders and/or orders of regular customers). Additionally, no mechanism exists to easily determine the amount of time taken for each preparation.

EXAMPLES, COMPONENTS, AND ALTERNATIVES

The following sections describe selected aspects of exemplary systems for preparation of modifiable recipe-based products, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative System

As shown in FIG. 1, this section describes an illustrative system suitable for use with methods described herein. FIG. 1 is a schematic block diagram of a networked system 100 having a remote server 102 coupled to a local server 104 through a computer network 106 (see further description of data processing systems and networks, below and in FIGS. 3 and 4).

Remote server 102 may include any suitable networked computer having a data store 108, which includes a set of pre-authored recipes and related information (e.g., customer information) for use in one or more associated stores or establishments 110 (e.g., restaurants, food kiosks, bars, and other types of stores). Information in data store 108 may include new recipes, limited time offers, and/or updates of old recipes.

Each establishment 110 includes local server 104, which has a local data store 112. Local data store 112 may comprise the same data as remote data store 108. In some examples, local data store 112 is a mirror of remote data store 108. One or more point-of-sale (POS) terminals 114 may be in communication with local server 104. POS terminal 114 may include any suitable device configured to present a user interface e.g., a graphical user interface (GUI), for selecting and/or entering customer order information, and to communicate that information to local server 104. Selectable order options may be communicated by the local server, and presented on the user interface of POS terminal 114.

In some examples, establishment 110 may be independent of any remote server(s), such that local server 104 is only in communication with the local POS terminal and other local devices, at least for the purposes of this system. This independence may be built in and/or may comprise a selectable "standalone mode." In some examples, local server 104 may be combined with POS terminal 114, such that the terminal and the local server exist in the same machine and perform the same functions they would separately. As indicated in FIG. 1, processing logic for carrying out the algorithms and methods described herein may be disposed in local server 104 and/or POS terminal 114.

A token generator 116 may also be in communication with local server 104 and/or POS terminal 114. Token generator 116 may include any suitable device configured to create, produce, or update an informational token 118 that can travel with a vessel 120 to be used in preparing the customer's order. For example, token 118 may include a printed ticket, a 3-D printed object, an RFID tag, a label, a sticker, a reusable tag, a near-field communication (NFC) device, and/or the like, or any combination of these. Tokens 118 may comprise any suitable materials, such as paper, metal, plastic, and/or the like. In some examples, token 118 may be permanently affixed to (or incorporated into) vessel 120. Token 118 includes a machine-readable object 122, such as indicia (e.g., a barcode, QR code, etc.) and/or devices (e.g., RFID tag, etc.). In the case of RFID tags and the like, the tag may be rewritable to include new information for each order. In some examples, token 118 is disposable. In some examples, token 118 is reusable and/or recyclable.

Establishments 110 may each include one or more work stations 124, such as one, two, three, four, five, or more stations. Each station may be customized or customizable for a particular step or phase of the order preparation process. Each station 124 may include a human-machine interface (HMI) 126 (such as a display, monitor, headset, earphone, speaker, etc.), a token reader 128, and one or more preparation devices 130. HMI 126 may include a computer in communication with local server 104, and may comprise any suitable display configured to convey information to the user, e.g., a touch screen display. HMI 126 and/or a peripheral device, such as a mouse (not shown), may be configured to communicate information, such as the time-stamped completion of a step in the preparation process, to local server 104. In some examples, a single HMI (e.g., a display) may be subdivided or otherwise apportioned into multiple HMI portions, each HMI portion corresponding to a different station. In some examples, when there are two or more HMIs, those HMIs may have common components. For example, first and second HMIs may comprise a single (i.e., same) display or monitor. In those examples, the single display may be divided into two or more portions, such as a first portion for the first HMI and the second portion for the second HMI. In some examples, an HMI comprises a single display having a plurality of display portions, each of the display portions of the HMI being associated with a different subset of the steps of the recipe being carried out. Accordingly, the system may communicate via each display portion only information regarding the associated subset of steps.

HMI 126 may include any suitable user interface, and in some examples may be configured to communicate information both to and from the user. For example, HMI 126 may include a display or monitor coupled to a mouse and/or keyboard. In some examples, HMI 126 may be configured to respond to gesture and/or voice commands. In some examples, HMI 126 may include facial recognition, gesture recognition, machine vision, voice recognition, and/or presence sensing technology. For example, HMI 126 may be configured to recognize that the user has changed from one person to another, and respond by switching automatically to the next order.

Reader 128 may include any suitable device configured to read the machine-readable indicia on tokens 118. For example, reader 128 may include a barcode scanner, a QR code reader, an RFID reader, an optical scanner, a computer vision-enabled camera, and/or the like. Prep devices 130 may include any suitable devices, such as mixers, blenders, spatulas, etc., used in the preparation of a recipe of ingredients 132 in vessel 120. Vessel 120 may include any suitable preparation vessel, e.g., a blender container, pitcher, carafe, bowl, platter, pan, etc.

Establishments 110 may include one or more additional components, such as a plurality of sensors (e.g., volume, weight, imaging, etc.). The sensors may be used to determine whether the recipe-based product matches a predetermined target characteristic within a predetermined or selected tolerance when completed. The predetermined target characteristic may include any suitable characteristic, such as total volume, total weight, shape, size, etc.

B. Illustrative Method

Figure 2:
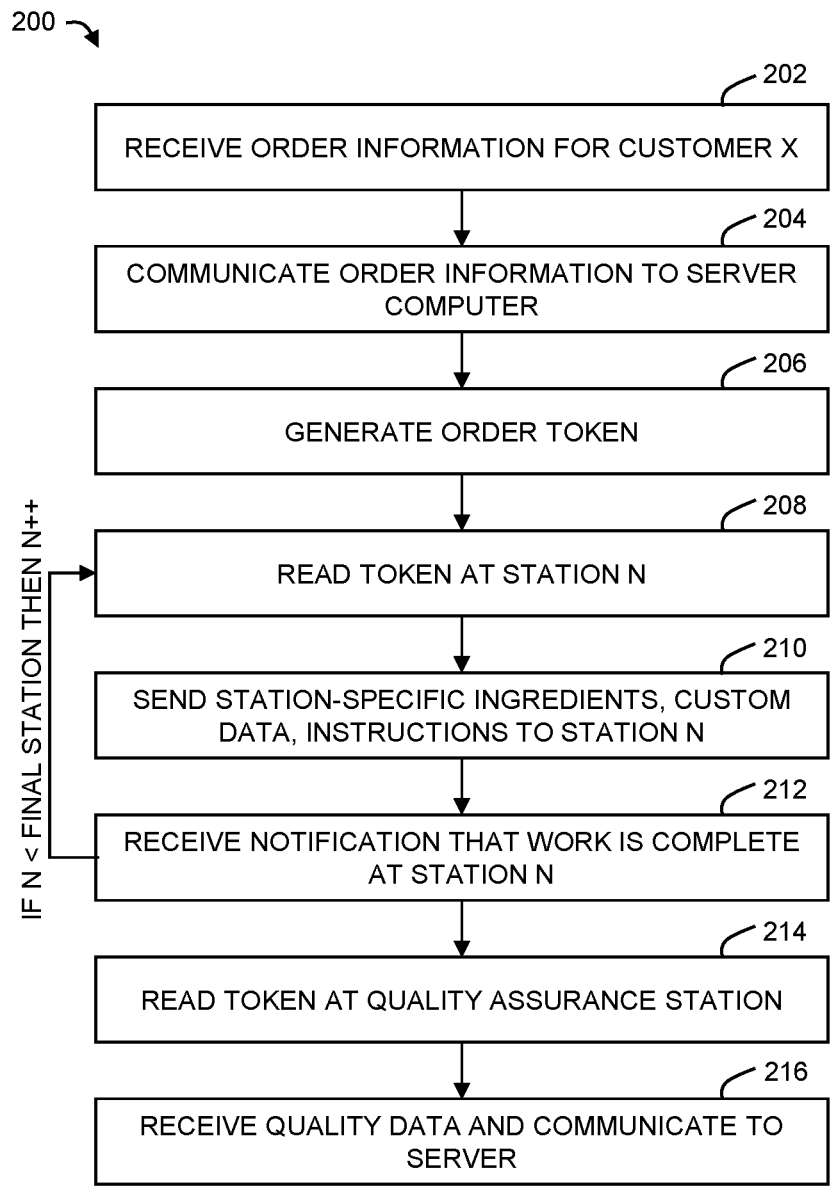
FIG. 2 is a flow chart depicting steps in an illustrative method for preparing modifiable recipe-based products according to the present teachings.

This section describes steps of an illustrative computer-implemented method for preparing a recipe-based product; see FIG. 2. Aspects of system 100 described above may be utilized in the method steps described below. Where appropriate, reference may be made to components and systems that may be used in carrying out each step. These references are for illustration, and are not intended to limit the possible ways of carrying out any particular step of the method.

FIG. 2 is a flowchart illustrating steps performed in an illustrative method 200, and may not recite the complete process or all steps of the method. Although various steps of method 200 are described below and depicted in FIG. 2, the steps need not necessarily all be performed, and in some cases may be performed in a different order than the order shown.

At step 202, order information may be received, e.g., via a POS terminal such as terminal 114, for a specific customer. A standard offering may be selected, modifications or custom ingredients may be added or removed, and/or a regular customer may select a saved order tailored to that customer (e.g., that customer's "usual" order). At step 204, the order information may be communicated to a server computer in communication with the terminal. For example, the order may be transmitted to the local server and/or the remote server (e.g., servers 104 and 102, described above). Information regarding the order may be stored in a data store (e.g., data stores 108, 112), for tracking and further analysis.

At step 206, a token may be generated, where the token includes machine-readable data identifying the specific order. For example, an order ticket may be printed with a barcode indicating the order ID, in addition to other information in human-readable form (e.g., the customer's name). In some examples, all necessary information for preparing the order may be embedded in the machine-readable code or RFID tag. Step 206 may include attaching the token to a suitable preparation vessel. In some examples, the token is a permanent or semi-permanent part of the vessel. In some examples, the vessel must be chosen from various vessels based on capacity and/or other characteristics.

At step 208, a preparer may transport the vessel and token to a first workstation, and the token may be read by a reader associated with the station. This step notifies the system that the vessel is currently at that station, and records a time-stamp associated with its arrival. Reading the token notifies the system that the vessel is at that station, and may trigger certain events, such as the communication of instructions associated with the order in question. The reader may send the order ID to the local server as a request for further instructions. However, the order ID may simply trigger the communication of instructions already at the station (see below).

At step 210, the server sends station-specific or step-specific ingredient information, customization information, and/or other instructions to the station for communicating to the preparer/user via a human-machine interface (HMI), which may be at the station or at a location accessible or central to two or more of the stations (when there are more than one station). For example, instructions may be displayed on a monitor at the station or on only a portion of a monitor that is at the station or that is in a location accessible or central to two or more stations (when there are more than one station). The preparer then utilizes the information displayed to carry out the applicable step(s) in the recipe. Modifications or additions to the standard recipe that were requested by the customer may be incorporated into the instructions. Known modifications and additions may be incorporated seamlessly (e.g., by updating ingredient quantities, etc.). Unfamiliar or non-standard modifications may be displayed in a distinct location on the HMI.

As noted above, in some examples the sending of station-specific information may be triggered by reading of the token. In some examples, the sending of station-specific information may be performed earlier (e.g., at time of ordering). For example, station-specific information may be parsed and communicated to all preparation stations coincidental with generation of the order token in step 206. In any case, reading of the token at a given station triggers communication of that station's instructions via the associated HMI.

At step 212, the preparer indicates to the system that work has been completed at that station. If one or more additional steps are required, the preparer moves the vessel and partially-prepared product to the next station to repeat steps 208 through 212. If completed, step 214 includes transporting the completed product in the vessel to a quality assurance (QA) station for inspection. The token is read at the QA station (by a reader) to verify its arrival and to indicate that a quality inspection was completed.

At step 216, quality-related data is communicated to the server(s) for tracking and analysis purposes. This data may include time-based information, such as total time to complete the order, time spent at each station, etc. Quality-related data may be communicated by the preparer, such as by inputting information regarding final fill volume, weight, shape, size, etc. The inputted information may be whether the final characteristic(s) of the completed product is at, below, or above the predetermined target characteristic(s) or within, below, or above predetermined tolerances for those target characteristic(s). In some examples, this information may be communicated to the system by the preparer by way of a user interface elements, such as virtual pushbuttons or the like.

The customer may then be presented with his or her ordered and prepared product.

C. Illustrative Data Processing System

Figure 3:
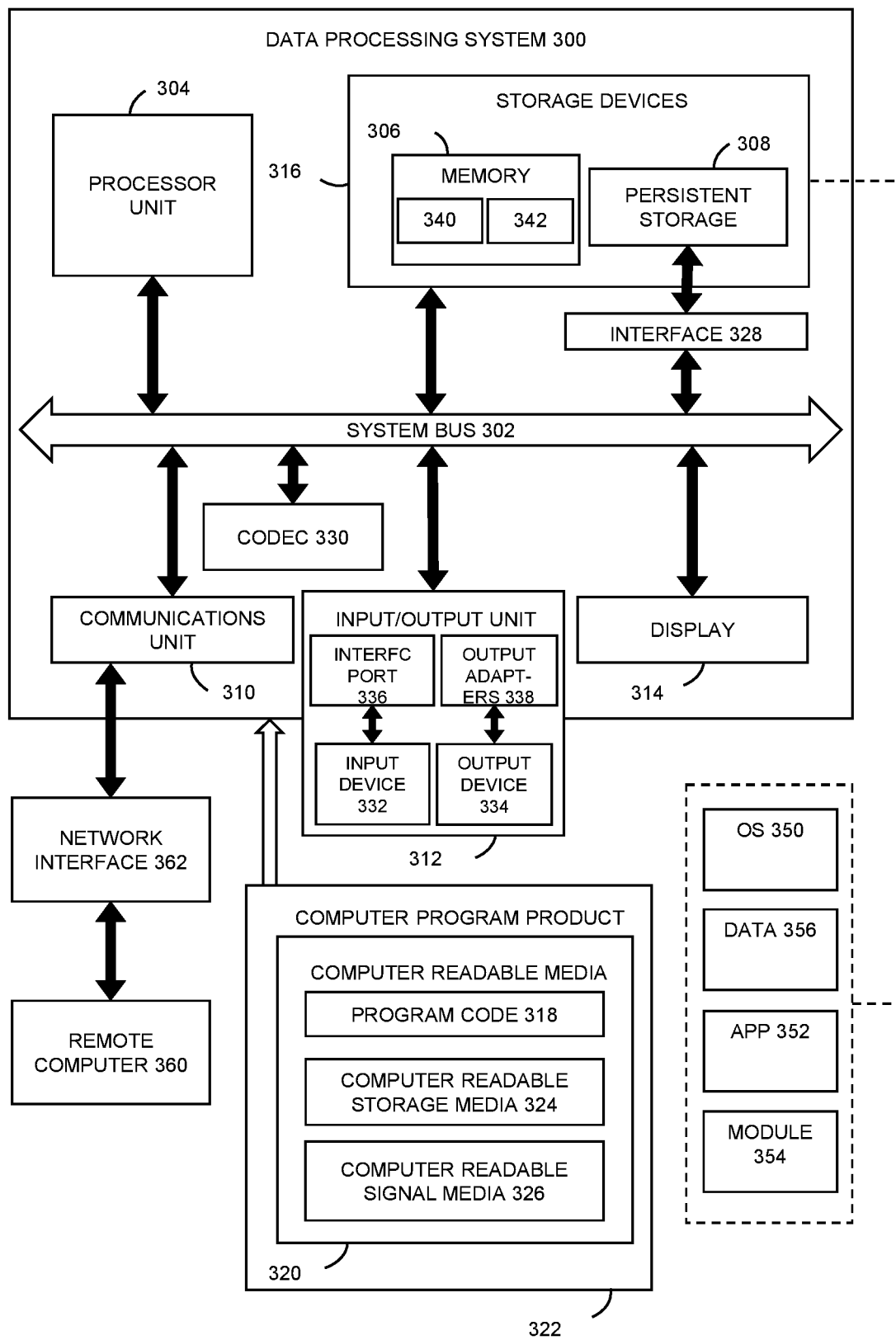
FIG. 3 is a schematic diagram of a data processing system, also referred to as a computer, suitable for use in systems described herein.

As shown in FIG. 3, this example describes a data processing system 300 (also referred to as a computer, computing system, and/or computer system) in accordance with aspects of the present disclosure. In this example, data processing system 300 is an illustrative data processing system suitable for implementing aspects of the recipe preparation system described above. More specifically, in some examples, devices that are embodiments of data processing systems (e.g., smartphones, tablets, personal computers) may be utilized as local and remote servers, POS terminals, HMIs, preparation station displays, readers, and printers.

In this illustrative example, data processing system 300 includes a system bus 302 (also referred to as communications framework). System bus 302 may provide communications between a processor unit 304 (also referred to as a processor or processors), a memory 306, a persistent storage 308, a communications unit 310, an input/output (I/O) unit 312, a codec 330, and/or a display 314. Memory 306, persistent storage 308, communications unit 310, input/output (I/O) unit 312, display 314, and codec 330 are examples of resources that may be accessible by processor unit 304 via system bus 302.

Processor unit 304 serves to run instructions that may be loaded into memory 306. Processor unit 304 may comprise a number of processors, a multi-processor core, and/or a particular type of processor or processors (e.g., a central processing unit (CPU), graphics processing unit (GPU), etc.), depending on the particular implementation. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device may include any suitable hardware capable of storing information (e.g., digital information), such as data, program code in functional form, and/or other suitable information, either on a temporary basis or a permanent basis.

Storage devices 316 also may be referred to as computer-readable storage devices or computer-readable media. Memory 306 may include a volatile storage memory 340 and a non-volatile memory 342. In some examples, a basic input/output system (BIOS), containing the basic routines to transfer information between elements within the data processing system 300, such as during start-up, may be stored in non-volatile memory 342. Persistent storage 308 may take various forms, depending on the particular implementation.

Persistent storage 308 may contain one or more components or devices. For example, persistent storage 308 may include one or more devices such as a magnetic disk drive (also referred to as a hard disk drive or HDD), solid state disk (SSD), floppy disk drive, tape drive, Jaz drive, Zip drive, flash memory card, memory stick, and/or the like, or any combination of these. One or more of these devices may be removable and/or portable, e.g., a removable hard drive. Persistent storage 308 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 308 to system bus 302, a removable or non-removable interface is typically used, such as interface 328.

Input/output (I/O) unit 312 allows for input and output of data with other devices that may be connected to data processing system 300 (i.e., input devices and output devices). For example, input device 332 may include one or more pointing and/or information-input devices, such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 304 through system bus 302 via interface port(s) 336. Interface port(s) 336 may include, for example, a serial port, a parallel port, a game port, and/or a universal serial bus (USB).

Output devices 334 may use some of the same types of ports, and in some cases the same actual ports, as input device(s) 332. For example, a USB port may be used to provide input to data processing system 300 and to output information from data processing system 300 to an output device 334. Output adapter 338 is provided to illustrate that there are some output devices 334 (e.g., monitors, speakers, and printers, among others) which require special adapters. Output adapters 338 may include, e.g. video and sounds cards that provide a means of connection between the output device 334 and system bus 302. Other devices and/or systems of devices may provide both input and output capabilities, such as remote computer(s) 360. Display 314 may include any suitable human-machine interface or other mechanism configured to display information to a user, e.g., a CRT, LED, or LCD monitor or screen, etc.

Communications unit 310 refers to any suitable hardware and/or software employed to provide for communications with other data processing systems or devices. While communication unit 310 is shown inside data processing system 300, it may in some examples be at least partially external to data processing system 300. Communications unit 310 may include internal and external technologies, e.g., modems (including regular telephone grade modems, cable modems, and DSL modems), ISDN adapters, and/or wired and wireless Ethernet cards, hubs, routers, etc. Data processing system 300 may operate in a networked environment, using logical connections to one or more remote computers 360. A remote computer(s) 360 may include a personal computer (PC), a server, a router, a network PC, a workstation, a microprocessor-based appliance, a peer device, a smart phone, a tablet, another network note, and/or the like. Remote computer(s) 360 typically include many of the elements described relative to data processing system 300. Remote computer(s) 360 may be logically connected to data processing system 300 through a network interface 362 which is connected to data processing system 300 via communications unit 310. Network interface 362 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 330 may include an encoder, a decoder, or both, comprising hardware, software, or a combination of hardware and software. Codec 330 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 330 is depicted as a separate component, codec 330 may be contained or implemented in memory, e.g., non-volatile memory 342.

Non-volatile memory 342 may include read only memory (ROM), programmable ROM (PROM), electrically programmable ROM (EPROM), electrically erasable programmable ROM (EEPROM), flash memory, and/or the like, or any combination of these. Volatile memory 340 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 316, which are in communication with processor unit 304 through system bus 302. In these illustrative examples, the instructions are in a functional form in persistent storage 308. These instructions may be loaded into memory 306 for execution by processor unit 304. Processes of one or more embodiments of the present disclosure may be performed by processor unit 304 using computer-implemented instructions, which may be located in a memory, such as memory 306.

These instructions are referred to as program instructions, program code, computer usable program code, or computer-readable program code executed by a processor in processor unit 304. The program code in the different embodiments may be embodied on different physical or computer-readable storage media, such as memory 306 or persistent storage 308. Program code 318 may be located in a functional form on computer-readable media 320 that is selectively removable and may be loaded onto or transferred to data processing system 300 for execution by processor unit 304. Program code 318 and computer-readable media 320 form computer program product 322 in these examples. In one example, computer-readable media 320 may comprise computer-readable storage media 324 or computer-readable signal media 326.

Computer-readable storage media 324 may include, for example, an optical or magnetic disk that is inserted or placed into a drive or other device that is part of persistent storage 308 for transfer onto a storage device, such as a hard drive, that is part of persistent storage 308. Computer-readable storage media 324 also may take the form of a persistent storage, such as a hard drive, a thumb drive, or a flash memory, that is connected to data processing system 300. In some instances, computer-readable storage media 324 may not be removable from data processing system 300.

In these examples, computer-readable storage media 324 is a non-transitory, physical or tangible storage device used to store program code 318 rather than a medium that propagates or transmits program code 318. Computer-readable storage media 324 is also referred to as a computer-readable tangible storage device or a computer-readable physical storage device. In other words, computer-readable storage media 324 is media that can be touched by a person.

Alternatively, program code 318 may be transferred to data processing system 300, e.g., remotely over a network, using computer-readable signal media 326. Computer-readable signal media 326 may be, for example, a propagated data signal containing program code 318. For example, computer-readable signal media 326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer-readable signal media 326 for use within data processing system 300. For instance, program code stored in a computer-readable storage medium in a server data processing system may be downloaded over a network from the server to data processing system 300. The computer providing program code 318 may be a server computer, a client computer, or some other device capable of storing and transmitting program code 318.

In some examples, program code 318 may comprise an operating system (OS) 350. Operating system 350, which may be stored on persistent storage 308, controls and allocates resources of data processing system 300. One or more applications 352 take advantage of the operating system's management of resources via program modules 354, and program data 356 stored on storage devices 316. OS 350 may include any suitable software system configured to manage and expose hardware resources of computer 300 for sharing and use by applications 352. In some examples, OS 350 provides application programming interfaces (APIs) that facilitate connection of different type of hardware and/or provide applications 352 access to hardware and OS services. In some examples, certain applications 352 may provide further services for use by other applications 352, e.g., as is the case with so-called "middleware." Aspects of present disclosure may be implemented with respect to various operating systems or combinations of operating systems.

The different components illustrated for data processing system 300 are not meant to provide architectural limitations to the manner in which different embodiments may be implemented. One or more embodiments of the present disclosure may be implemented in a data processing system that includes fewer components or includes components in addition to and/or in place of those illustrated for computer 300. Other components shown in FIG. 3 can be varied from the examples depicted. Different embodiments may be implemented using any hardware device or system capable of running program code. As one example, data processing system 300 may include organic components integrated with inorganic components and/or may be comprised entirely of organic components (excluding a human being). For example, a storage device may be comprised of an organic semiconductor.

In some examples, processor unit 304 may take the form of a hardware unit having hardware circuits that are specifically manufactured or configured for a particular use, or to produce a particular outcome or progress. This type of hardware may perform operations without needing program code 318 to be loaded into a memory from a storage device to be configured to perform the operations. For example, processor unit 304 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 318) may be implemented as hardware, e.g., by specifying an FPGA configuration using a hardware description language (HDL) and then using a resulting binary file to (re)configure the FPGA.

In another example, data processing system 300 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose, and may execute hardware-coded logic without sharing resources. Such systems are often utilized for safety-related and mission-critical tasks.

In still another illustrative example, processor unit 304 may be implemented using a combination of processors found in computers and hardware units. Processor unit 304 may have a number of hardware units and a number of processors that are configured to run program code 318. With this depicted example, some of the processes may be implemented in the number of hardware units, while other processes may be implemented in the number of processors.

In another example, system bus 302 may comprise one or more buses, such as a system bus or an input/output bus. Of course, the bus system may be implemented using any suitable type of architecture that provides for a transfer of data between different components or devices attached to the bus system. System bus 302 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 310 may include a number of devices that transmit data, receive data, or both transmit and receive data. Communications unit 310 may be, for example, a modem or a network adapter, two network adapters, or some combination thereof. Further, a memory may be, for example, memory 306, or a cache, such as that found in an interface and memory controller hub that may be present in system bus 302.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

D. Illustrative Distributed Data Processing System

Figure 4:
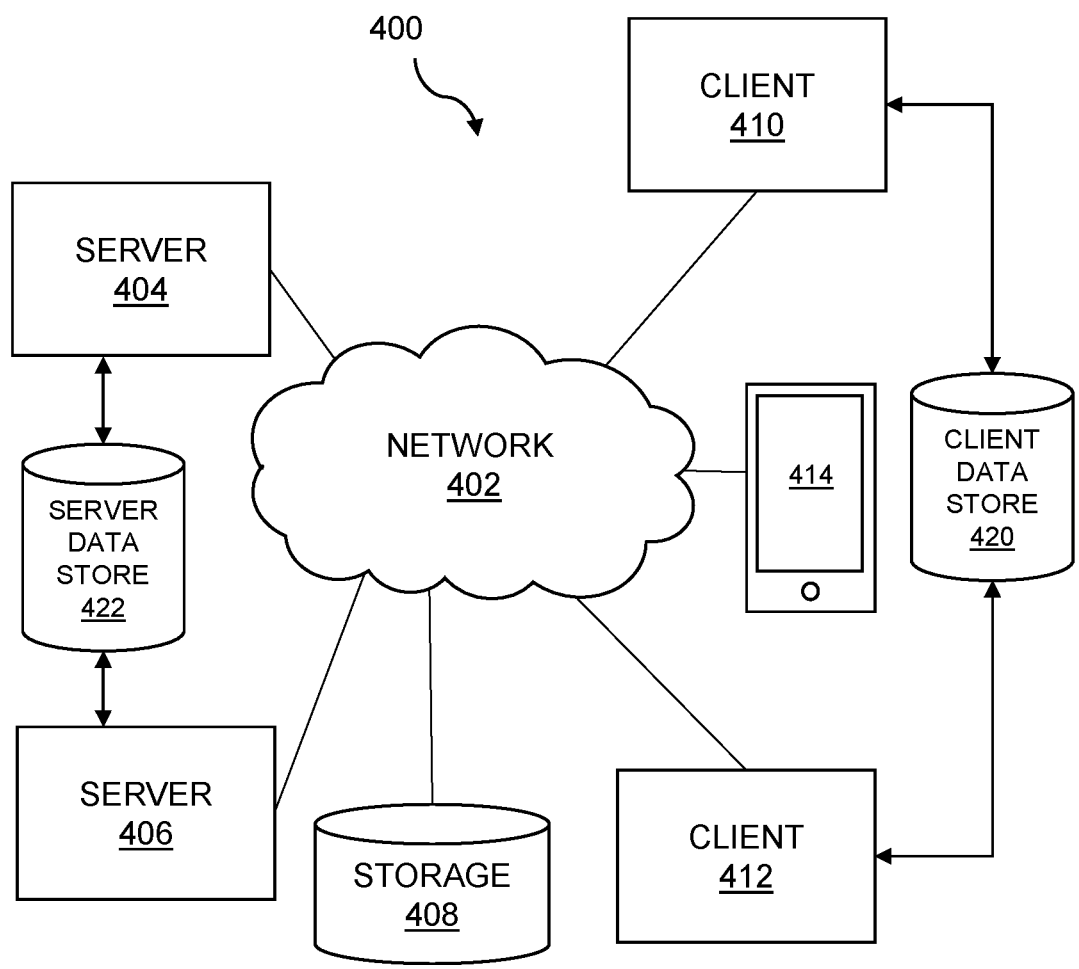
FIG. 4 is a schematic diagram of a distributed data processing system, also referred to as a computer network, suitable for use in systems described herein.

As shown in FIG. 4, this example describes a general network data processing system 400, interchangeably termed a computer network, a network system, a distributed data processing system, or a distributed network, aspects of which may be included in one or more illustrative embodiments of the recipe preparation system described herein. For example, network 106, and system 100 in general, may be examples of distributed data processing system 400.

It should be appreciated that FIG. 4 is provided as an illustration of one implementation and is not intended to imply any limitation with regard to environments in which different embodiments may be implemented. Many modifications to the depicted environment may be made.

Network system 400 is a network of devices (e.g., computers), each of which may be an example of data processing system 300, and other components. Network data processing system 400 may include network 402, which is a medium configured to provide communications links between various devices and computers connected within network data processing system 400. Network 402 may include connections such as wired or wireless communication links, fiber optic cables, and/or any other suitable medium for transmitting and/or communicating data between network devices, or any combination thereof.

In the depicted example, a first network device 404 and a second network device 406 connect to network 402, as do one or more computer-readable memories or storage devices 408. Network devices 404 and 406 are each examples of data processing system 300, described above. In the depicted example, devices 404 and 406 are shown as server computers, which are in communication with one or more server data store(s) 422 that may be employed to store information local to server computers 404 and 406, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 410 and 412 and/or a client smart device 414, may connect to network 402. Each of these devices is an example of data processing system 300, described above regarding FIG. 3. Client electronic devices 410, 412, and 414 may include, for example, one or more personal computers, network computers, and/or mobile computing devices such as personal digital assistants (PDAs), smart phones, handheld gaming devices, wearable devices, and/or tablet computers, and the like. In the depicted example, server 404 provides information, such as boot files, operating system images, and applications to one or more of client electronic devices 410, 412, and 414. Client electronic devices 410, 412, and 414 may be referred to as "clients" in the context of their relationship to a server such as server computer 404. Client devices may be in communication with one or more client data store(s) 420, which may be employed to store information local to the clients (e.g., cookie(s) and/or associated contextual information). Network data processing system 400 may include more or fewer servers and/or clients (or no servers or clients), as well as other devices not shown.

In some examples, first client electric device 410 may transfer an encoded file to server 404. Server 404 can store the file, decode the file, and/or transmit the file to second client electric device 412. In some examples, first client electric device 410 may transfer an uncompressed file to server 404 and server 404 may compress the file. In some examples, server 404 may encode text, audio, and/or video information, and transmit the information via network 402 to one or more clients.

Client smart device 414 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may also include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 400 may be stored in or on a computer-readable storage medium, such as network-connected storage device 408 and/or a persistent storage 308 of one of the network computers, as described above, and may be downloaded to a data processing system or other device for use. For example, program code may be stored on a computer-readable storage medium on server computer 404 and downloaded to client 410 over network 402, for use on client 410. In some examples, client data store 420 and server data store 422 reside on one or more storage devices 408 and/or 308.

Network data processing system 400 may be implemented as one or more of different types of networks. For example, system 400 may include an intranet, a local area network (LAN), a wide area network (WAN), or a personal area network (PAN). In some examples, network data processing system 400 includes the Internet, with network 402 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 402 may be referred to as a "cloud." In those examples, each server 404 may be referred to as a cloud computing node, and client electronic devices may be referred to as cloud consumers, or the like. FIG. 4 is intended as an example, and not as an architectural limitation for any illustrative embodiments.

E. Illustrative Combinations and Additional Examples

This section describes additional aspects and features of systems and methods for preparing recipe-based products, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method of preparing recipe-based products, comprising:

receiving, via a terminal, order information for a recipe-based product;

transmitting, via the terminal, the order information to a server computer;

receiving, via the terminal, a recipe for the recipe-based product from the server computer;

generating, using a token generator coupled to the terminal, a machine-readable token having the recipe stored therein;

reading, via a first token reader at a first station, the generated token;

communicating, via a first human-machine interface (HMI) at the first station, only the one or more steps of the recipe that are associated with the first station;

reading, via a second reader at a second station, the generated token; and communicating, via a second HMI at the second station, only the one or more steps of the recipe that are associated with the second station.

A1. The method of A0, wherein receiving the order information includes receiving one or more customer modifications to the recipe-based product, and wherein receiving a recipe for the recipe-based product includes receiving, via the terminal, the recipe that includes the received one or more customer modifications.

A2. The method of A0, where the first station includes a first appliance, wherein communicating only the one or more steps of the recipe that are associated with the first station includes communicating, via the first HMI at the first station, only the one or more steps of the recipe that require the use of the first appliance.

A3. The method of A2, where the second station includes a second appliance different from the first appliance, wherein communicating only the one or more steps of the recipe that are associated with the second station includes communicating, via the second HMI at the second station, only the one or more steps of the recipe that require the use of the second appliance.

A4. The method of A0, wherein communicating the one or more steps of the recipe associated with the first station includes communicating, via the first HMI at the first station, one or more ingredients or quantities of ingredients associated with only the one or more steps of the recipe associated with the first station, and wherein communicating the one or more steps of the recipe associated with the second station includes communicating, via the second HMI at the second station, one or more ingredients or quantities of ingredients associated with only the one or more steps of the recipe associated with the second station.

A5. The method of A0, wherein the token is a RFID tag, the token generator is a RFID writer, the first token reader is a first RFID reader, and the second token reader is a second RFID reader, such that generating a token having the received recipe stored therein includes writing, via the RFID writer, the received recipe on the RFID tag.

A6. The method of A0, further comprising receiving, via at least one input device, completion data regarding completion of one or more steps of the recipe.

A7. The method of A6, further comprising:

determining, using processing logic, whether a step of the recipe is incomplete based on the completion data received from the at least one input device; and communicating, via at least one HMI of the first and second HMIs, an alert requesting that the incomplete step be completed.

A8. The method of A7, wherein determining whether a step of the recipe associated with the first station is incomplete is performed in response to reading the generated token at the second station, and wherein communicating the alert includes communicating, via the second HMI, the alert requesting that the at least one uncompleted step be completed at the first station.

A9. The method of A7, further comprising communicating, via a third HMI, completion of the one or more steps of the recipe based on the completion data received from the at least one input device.

A10. The method of A9, wherein communicating completion of the one or more steps of the recipe further includes communicating, via the third HMI, receipt of the order information for the recipe-based product at the terminal.

A11. The method of A7, further comprising tracking, using the processing logic, a time duration to complete one or more steps of the recipe based on the inputs received from the at least one input device.

A12. The method of A11, further comprising communicating, via a third HMI, the tracked time duration.

A13. The method of A0, wherein transmitting the order information to the server computer includes transmitting geographic location information of the terminal to the server computer.

A14. The method of A13, wherein receiving the recipe for the recipe-based product from the server computer includes receiving, via the terminal, a geographically-targeted recipe for the recipe-based product from the server computer based on the transmitted geographic information.

A15. The method of A0, wherein the recipe for the recipe-based product includes a predetermined target characteristic, the method further comprising:

receiving, via at least one input device, results data regarding a relationship between the recipe-based product and the predetermined target characteristic after all the steps of the recipe are completed.

A16. The method of A15, wherein the predetermined target characteristic is a predetermined target total volume of the recipe-based product, wherein receiving results data includes receiving, via at least one input device, whether the recipe-based product matches the predetermined target total volume within a predetermined tolerance.

A17. The method of A15, wherein the predetermined target characteristic is a predetermined target total weight of the recipe-based product, wherein receiving results data includes receiving, via at least one input device, whether the recipe-based product matches the predetermined target total weight within a predetermined tolerance.

A18. The method of A15, wherein the predetermined target characteristic is a predetermined target shape of the recipe-based product, wherein receiving results data includes receiving, via at least one input device, whether the recipe-based product matches the predetermined target shape within a predetermined tolerance.

A19. The method of A15, wherein the receiving results data includes receiving imaging data.

A20. The method of A15, wherein the receiving results data includes receiving weight data.

A21. The method of A15, further comprising transmitting, via the terminal, the received results data to the server computer.

A22. The method of A21, wherein the recipe for the recipe-based product is automatically modified by other results data from a plurality of other terminals for the recipe-based product from the server computer.

B0. A method of preparing recipe-based products, comprising:

receiving, at a terminal, order information for a recipe-based product;

transmitting, from the terminal, the order information to a server computer;

receiving, at the terminal, a recipe for the recipe-based product from the server computer, wherein the recipe for the recipe-based product includes a predetermined target characteristic;

generating, via a token generator in communication with the terminal, a token having the received recipe stored therein;

reading, via a token reader, the generated token;

communicating, via a human-machine interface (HMI) associated with the token reader, one or more of the steps of the recipe; and receiving, after receiving indication that all the steps of the recipe are completed, via at least one input device, results data regarding a relationship between the recipe-based product and the predetermined target characteristic.

B1. The method of B0, further comprising receiving, via at least one input device, completion data regarding completion of one or more steps of the recipe.

B2. The method of B1, further comprising:

determining, via the terminal, whether a step of the recipe is incomplete based on the completion data received from the at least one input device; and communicating, via the HMI, an alert requesting that the incomplete step be completed.

B3. The method of B1, further comprising tracking, via the terminal, time duration to complete one or more steps of the recipe based on the inputs received from the at least one input device.

B4. The method of B3, further comprising displaying, via the HMI, the tracked time duration.

C0. A method of providing recipes for recipe-based products, comprising:

receiving, at a server computer, order information for one or more recipe-based products from a plurality of remote terminals;

transmitting, from the server computer, recipes corresponding to the one or more recipe-based products to the plurality of remote terminals, wherein the recipes include one or more predetermined target characteristics;

receiving, at the server computer, results data for the recipes from the plurality of remote terminals, wherein the results data includes quantitative relationships between the one or more recipe-based products and the one or more predetermined target characteristics; and modifying, using the server computer, one or more of the recipes based on the received results data.

C1. The method of C0, wherein modifying one or more of the recipes based on the received results data includes modifying the amount of one or more ingredients based on the received results data.

C2. The method of C1, where the one or more predetermined target characteristics includes a total volume, and wherein receiving results data for the recipes includes receiving results data regarding whether the one or more recipe-based products were at, below, or above the predetermined target total volume.

C3. The method of C0, wherein receiving order information for one or more recipe-based products includes receiving, at the server computer, geographic location information of the plurality of remote terminals.

C4. The method of C3, wherein transmitting recipes for the one or more recipe-based products includes transmitting, from the server computer, geographically-targeted recipes for the one or more recipe-based products to the plurality of remote terminals based on the received geographic location information.

D0. A system comprising:

a point-of-sale (POS) terminal configured to receive orders selected from a plurality of recipe-based products;

one or more product preparation stations each having an associated human-machine interface (HMI);

processing logic in communication with the POS terminal and the one or more product preparation stations, the processing logic configured to:

receive, from the POS terminal, an order identifying a product and product modifier information, wherein the product is selected from the plurality of recipe-based products;

communicate preparation information to the one or more product preparation stations based on a recipe corresponding to the identified product and modified by the modification information; and communicate, via the respective HMI at each of the one or more product preparation stations, only steps of the recipe that are associated with the respective product preparation station.

D1. The system of D0, further comprising a preparation vessel transportable to each of the one or more product preparation stations; and a token generator in communication with the processing logic, the token generator configured to produce a machine-readable token attachable to the preparation vessel;

wherein the machine-readable token includes information identifying the order.

D2. The system of D1, wherein the preparation vessel comprises a container configured to hold liquids.

D3. The system of D0, wherein each of the one or more product preparation stations comprises a food preparation station.

D4. The system of D0, further comprising a server in communication with the processing logic, the server including a data store comprising a plurality of recipes corresponding to the recipe-based products.

D5. The system of D4, wherein the server is remote with respect to the POS terminal.

D6. The system of D4, wherein the processing logic is further configured to communicate the modifier information to the server.

D7. The system of D0, wherein each of the HMIs comprises a display screen.

E0. A method of preparing recipe-based products, the method comprising:

inputting an order at a point-of-sale (POS) terminal, the order identifying a selected recipe based-product and product modifier information, wherein inputting the order automatically communicates, using processing logic associated with the POS terminal, preparation instructions to a plurality of product preparation stations based on a recipe corresponding to the selected product and modified by the modification information, wherein each of the product preparation stations receives only selected preparation instructions associated with the respective product preparation station;

generating a machine-readable token having information identifying the order encoded therein;

attaching the machine-readable token to a transportable preparation vessel;

transporting the preparation vessel to a first product preparation station of the plurality of product preparation stations, wherein each of the product preparation stations includes an associated token reader and an associated human-machine interface (HMI);

reading the machine-readable token using the associated token reader of the first product preparation station;

executing preparation instructions communicated via the associated HMI at the first product preparation station, using the preparation vessel, wherein the associated HMI communicates only the selected preparation instructions associated with the first product preparation station; and transporting the preparation vessel to a second product preparation station of the plurality of product preparation stations.

E1. The method of E0, further comprising:
in response to completion of all of the preparation instructions, transporting the preparation vessel with the selected recipe based-product disposed therein to a quality assurance station;
automatically communicating quality-related information regarding the prepared product to a server computer.

E2. The method of E0, wherein reading of the machine-readable token automatically records a time associated with arrival at the first preparation station.

E3. The method of E0, wherein the preparation vessel comprises a container configured to hold liquids.

E4. The method of E0, wherein the preparation vessel comprises a container configured to hold solids.

E5. The method of E0, wherein each of the product preparation stations comprises a food preparation station.

E6. The method of E0, wherein a server computer is in communication with the processing logic, the server computer including a data store comprising a plurality of recipes, one of the plurality of recipes being associated with the selected recipe based-product.

E7. The method of E6, wherein the server is remote with respect to the POS terminal.

E8. The method of E0, wherein each of the associated HMIs comprises a display screen.

Advantages, Features, and Benefits

The different embodiments and examples of the systems and methods for preparing modifiable recipe-based products described herein provide several advantages over known solutions. For example, illustrative embodiments and examples described herein facilitate automatic updates when recipe data is added to the data store(s).

Additionally, and among other benefits, illustrative embodiments and examples described herein limit the information displayed at a given workstation (e.g., the specific ingredients, amounts, and preparation instructions) to the current product and step of the recipe. This simplifies the process and reduces potential errors.

Additionally, and among other benefits, illustrative embodiments and examples described herein parse the information presented on a single fractionated or partitioned display at a given workstation, such that it presents only information pertinent to the current product and step of the recipe in each corresponding fraction or partition of the display. This enables a user at the workstation to obtain the benefits of step-focused information parsing without having to leave the workstation.

Additionally, and among other benefits, illustrative embodiments and examples described herein replace or reduce the need for multiple preparation stations by including a fractionated or partitioned display screen. This may be based on equipment needs or space limitations (e.g., at a compact station for producing coffee drinks).

Additionally, and among other benefits, illustrative embodiments and examples described herein ensure there is only one place for the preparer to look with respect to instructions, and the recipe information is always up to date, further minimizing errors.

Additionally, and among other benefits, illustrative embodiments and examples described herein facilitate data tracking and analysis, improve throughput by reducing information look-up, and improve quality by tracking final fill levels of liquid and/or solid products.

Additionally, and among other benefits, illustrative embodiments and examples described herein reduce the need for training and speed the training process.

Additionally, and among other benefits, illustrative embodiments and examples described herein enable the preparation of customized, obsolete, and limited-time recipes with the same level of quality and ease of implementation as any standard recipe, due to the standard interface and automated instructions.

Additionally, and among other benefits, illustrative embodiments and examples described herein include a permanent rewritable token (e.g., a rewritable RFID tag or chip) as part of the preparation vessel, which means the token can know what capacity and/or type of vessel was present. This facilitates, among other things, an error prevention system that prevents or warns against using an inappropriate vessel for the present order.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of preparing recipe-based products, comprising:
receiving, via a terminal, order information for a recipe-based product;
transmitting, via the terminal, the order information to a server computer;
receiving, via the terminal, a recipe for the recipe-based product from the server computer;
generating, using a token generator coupled to the terminal, a machine-readable, physical token having the recipe stored therein;
reading, via a first token reader at a first station, the generated physical token;
communicating, via a first human-machine interface (HMI) at the first station, only the one or more steps of the recipe that are to be completed at the first station;
reading, via a second token reader at a second station, the generated physical token; and
communicating, via a second HMI at the second station, only the one or more steps of the recipe that are to be completed at the second station.

2. The method of claim 1, wherein receiving the order information includes receiving one or more customer modifications to the recipe-based product, and wherein receiving a recipe for the recipe-based product includes receiving, via the terminal, the recipe that includes the received one or more customer modifications.

3. The method of claim 1, where the first station includes a first appliance, wherein communicating only the one or more steps of the recipe that are to be completed at the first station includes communicating, via the first HMI at the first station, only the one or more steps of the recipe that require the use of the first appliance.

4. The method of claim 3, further comprising receiving, via at least one input device, completion data regarding completion of one or more steps of the recipe.

5. The method of claim 4, further comprising:
determining, using processing logic, whether a step of the recipe is incomplete based on the completion data received from the at least one input device; and
communicating, via at least one HMI of the first and second HMIs, an alert requesting that the incomplete step be completed.

6. The method of claim 5, wherein determining whether a step of the recipe is incomplete is performed in response to reading the generated physical token at the second station, and wherein communicating the alert includes communicating, via the second HMI, the alert requesting that the at least one uncompleted step be completed at the first station.

7. The method of claim 5, further comprising tracking, using the processing logic, a time duration to complete one or more steps of the recipe based on the inputs received from the at least one input device.

8. The method of claim 1, wherein transmitting the order information to the server computer includes transmitting geographic location information of the terminal to the server computer.

9. The method of claim 8, wherein receiving the recipe for the recipe-based product from the server computer includes receiving, via the terminal, a geographically-targeted recipe for the recipe-based product from the server computer based on the geographic location information.

10. A method of preparing recipe-based products, comprising:
receiving, at a terminal, order information for a recipe-based product;
transmitting, from the terminal, the order information to a server computer;
receiving, at the terminal, a recipe for the recipe-based product from the server computer, wherein the recipe for the recipe-based product includes a predetermined target characteristic;
generating, via a token generator in communication with the terminal, a physical token having the received recipe stored therein;
reading, via a token reader, the generated physical token;
communicating, via a human-machine interface (HMI) associated with the token reader, one or more of the steps of the recipe; and
receiving, after receiving indication that all the steps of the recipe are completed, via at least one input device, results data regarding a relationship between the recipe-based product and the predetermined target characteristic.

11. The method of claim 10, further comprising receiving, via at least one input device, completion data regarding completion of one or more steps of the recipe.

12. The method of claim 11, further comprising:
determining, via the terminal, whether a step of the recipe is incomplete based on the completion data received from the at least one input device; and
communicating, via the HMI, an alert requesting that the incomplete step be completed.

13. The method of claim 11, further comprising tracking, via the terminal, time duration to complete one or more steps of the recipe based on the inputs received from the at least one input device.

14. The method of claim 10, wherein the HMI comprises a single display having a plurality of display portions, each of the display portions of the HMI being associated with a different subset of the steps of the recipe, the method further comprising:
communicating via each display portion only information regarding the associated subset of steps.

15. A system, comprising:
a point-of-sale (POS) terminal configured to receive orders selected from a plurality of recipe-based products;
one or more product preparation stations each having an associated human-machine interface (HMI);
processing logic in communication with the POS terminal and the one or more product preparation stations, the processing logic configured to:
receive, from the POS terminal, an order identifying a product and product modifier information, wherein the product is selected from the plurality of recipe-based products,
communicate preparation information to the one or more product preparation stations based on a recipe corresponding to the identified product and modified by the modification information, and
communicate, via the respective HMI at each of the one or more product preparation stations, only steps of the recipe that are to be completed at the respective product preparation station; and
a token generator in communication with the processing logic, the token generator configured to produce a machine-readable physical token, wherein the machine-readable physical token includes information identifying the order.

16. The system of claim 15, further comprising a preparation vessel transportable to each of the one or more product preparation stations, wherein the machine-readable physical token is attachable to the preparation vessel.

17. The system of claim 16, wherein the preparation vessel comprises a container configured to hold liquids.

18. The system of claim 15, wherein each of the one or more product preparation stations comprises a food preparation station.

19. The system of claim 15, further comprising a server in communication with the processing logic, the server including a data store comprising a plurality of recipes corresponding to the recipe-based products, wherein the server is remote with respect to the POS terminal.

20. The method of claim 1, wherein the physical token is one of a barcode, a QR code, or a RFID tag, and wherein at least one of the first token reader or the second token reader is one of a barcode scanner, a QR code reader, an RFID reader, an optical scanner, or a computer vision-enabled camera.

* * * * *